United States Patent [19]

Swoboda et al.

[11] 4,224,419
[45] Sep. 23, 1980

[54] WEATHERING-RESISTANT, HIGH-IMPACT, EASILY COLORED THERMOPLASTIC COMPOSITIONS

[75] Inventors: Johann Swoboda, Ludwigshafen; Gerhard Lindenschmidt, Leimen; Claus Bernhard, Eisenberg, all of Fed. Rep. of Germany

[73] Assignee: BASF Aktiengesellschaft, Fed. Rep. of Germany

[21] Appl. No.: 31,011

[22] Filed: Apr. 17, 1979

[30] Foreign Application Priority Data

Jun. 20, 1978 [DE] Fed. Rep. of Germany ....... 2826925

[51] Int. Cl.$^2$ ...................... C08L 51/04; C08L 33/08
[52] U.S. Cl. .................................... 525/71; 260/42.21
[58] Field of Search .......................................... 525/71

[56] References Cited

U.S. PATENT DOCUMENTS

| | | | |
|---|---|---|---|
| 3,055,859 | 9/1962 | Vollmert | 260/45.5 |
| 3,509,237 | 4/1970 | Aubrey | 260/876 |
| 3,691,260 | 9/1972 | Mittnacht et al. | 260/876 |

FOREIGN PATENT DOCUMENTS 1124911  8/1968  United Kingdom .

*Primary Examiner*—Carman J. Seccuro
*Attorney, Agent, or Firm*—Keil & Witherspoon

[57] ABSTRACT

Mixtures which essentially consist of a graft copolymer (A), a graft copolymer (B) and a hard component (C), the latter consisting of copolymers of stryrene and/or α-methylstyrene with acrylonitrile. The graft copolymers (A) and (B) are each based on a crosslinked acrylic ester rubber onto which is grafted a mixture of styrene and acrylonitirle. They differ only slightly in chemical composition, but differ substantially in the particle size of the acrylic ester base used for grafting. The weight ratio of the grafting bases can be from 90:10 to 35:65, and the proportion of the two grafting bases together, based on the total mixture, is from about 10 to 35 percent by weight. Mixtures of the above 3 components are weathering-resistant, exhibit a high impact strength, and are easy to color. The use of such mixtures by conventional thermoplastic processing methods, eg. extrusion or injection molding, gives, especially after the material has been colored, vitrually no difference in hue in the vicinity of a gate or of a weld line, so that a great variety of moldings for daily use or for leisure purposes can be produced.

10 Claims, No Drawings

WEATHERING-RESISTANT, HIGH-IMPACT, EASILY COLORED THERMOPLASTIC COMPOSITIONS

The present invention relates to mixtures of styrene-acrylonitrile copolymers toughened with rubbery acrylic ester polymers, which mixtures give weathering-resistant thermoplastic molding materials which have high impact strength and are easily colored.

It is known that thermoplastically processable high-impact molding materials can be prepared by modifying styrene/acrylonitrile copolymers by incorporation of rubbers. This is in general done by graft copolymerization of styrene and acrylonitrile in the presence of the rubber, which may or may not be followed by mixing this graft product with a separately prepared hard component which in general consists of a styrene-acrylonitrile copolymer. Depending on the nature of the rubber employed in the process, molding materials having different patterns of properties are obtained.

In ABS polymers, diene polymers are used as the rubber for toughening. The products thus obtained have a good impact strength, in particular at very low temperatures; however, their relatively low weathering resistance and aging resistance are troublesome. If it is desired to obtain products which are not only impact-resistant but also weathering-resistant and aging-resistant, saturated rubbers must be employed for the graft copolymerization. Elastomeric, preferably crosslinked, acrylic acid ester polymers have proved particularly suitable for this purpose. The molding materials obtained, which are also referred to as ASA polymers, are principally used for garden furniture, boats, signs, street lamp covers and the like, and for many of the applications colored products, which produce a luminous and brilliant color impression, are desired.

The manufacture of weathering-resistant and aging-resistant ASA polymers is described, inter alia, in U.S. Pat. No. 3,055,859 and German Pat. No. 1,260,135. In these processes, the rubbery acrylic acid ester polymer which serves as the grafting base is first prepared by emulsion polymerization of acrylic acid esters of 4 to 8 carbon atoms. The latex thereby produced in general has particles with a mean diameter of the order of <100 nm. Thereafter, a mixture of styrene and acrylonitrile is grafted onto this polyacrylic acid ester latex, the graft copolymerization also being preferably carried out in emulsion. To obtain ASA polymers having good mechanical properties it has proved necessary that the polyacrylic acid ester rubber which serves as the grafting base should be crosslinked, ie. that it should be manufactured by copolymerizing the acrylic acid esters with small amounts of bifunctional, crosslinking monomers.

A further development of the process disclosed in German Pat. No. 1,260,135 for the manufacture of ASA polymers is described in German Laid-Open Application DOS No. 1,911,882. According to this publication, the grafting base employed in the graft polymerization is a coarse latex of a crosslinked acrylic acid ester polymer, having a mean particle diameter of from 150 to 800 nm and a narrow particle size distribution. Compared to the products manufactured using fine acrylic acid ester polymer latices as the grafting base, the ASA polymers manufactured using coarse acrylic acid ester polymer latices are distinguished by improved notched impact strength, greater hardness and reduced shrinkage. In contrast to the ASA polymers based on fine graft copolymers, the ASA polymers based on the coarse graft copolymers are difficult to color and can therefore only be used with considerable restrictions for the manufacture of colored moldings. If ASA polymers based on a coarse graft copolymer are colored, only dull pastel hues can be obtained, but not the brilliant luminous colorations, without cloudiness, which the market demands.

It is an object of the present invention to provide weathering-resistant products based on ASA polymers, which in addition to the advantageous properties of the conventional molding materials of this type, such as weathering resistance, aging resistance, rigidity and strength, exhibit not only substantially improved impact strength but in addition are easy to color, thereby allowing the manufacture of moldings in brilliant, luminous colors.

We have found that this object is achieved by the compositions according to the invention, comprising a mixture based on two different graft copolymers of styrene and acrylonitrile onto crosslinked rubbery acrylic acid ester polymers.

Accordingly, the present invention relates to weathering-resistant, high-impact thermoplastic compositions which can be colored easily and which essentially consist of a mixture of (A) a first graft copolymer which is formed from (A1) 55–75% by weight, preferably 60–70% by weight, based on (A), of a crosslinked acrylic ester polymer having a glass transition temperature of below 0° C. and a mean particle diameter (weight average) of from about 50 to 150 nm, as the grafting base, onto which are grafted (A2) from 45 to 25% by weight, preferably from 40 to 30% by weight, based on (A), of a mixture of styrene and acrylonitrile in the weight ratio of from 80:20 to 65:35, (B) a second, separately prepared graft copolymer which is formed from (B1) 60–80% by weight, preferably 65–80% by weight, based on (B), of a crosslinked acrylic ester polymer having a glass transition temperature of below 0° C. and a mean particle diameter (weight average) in the range from about 200 to 500 nm, as the grafting base, onto which are grafted (B2) 40–20% by weight, preferably 35–20% by weight, based on (B), of a mixture of styrene and acrylonitrile in the weight ratio of from 80:20 to 65:35, and (C) a hard component consisting of one or more copolymers of styrene and/or α-methylstyrene with acrylonitrile, which copolymers contain 20–40% by weight of acrylonitrile as copolymerized units, with the proviso that in the mixture ((A)+(B)+(C)) the weight ratio of the grafting bases (A1):(B1) is from about 90:10 to 35:65, and the proportion of the sum of the two grafting bases ((A1)+(B1)) is from about 10 to 35% by weight, based on the total mixture ((A)+(B)+(C)).

The mixtures according to the invention may or may not contain conventional additives and/or assistants, in conventional and effective amounts, as additional components (D).

German Published Application DAS No. 1,745,098 has already described a polymer mixture of a thermoplastic styrene/acrylonitrile copolymer with two graft copolymers of different particle size. The two graft copolymers consist of styrene and acrylonitrile grafted onto a grafting base consisting of a polymer of an aliphatic 1,3-diene. Accordingly, the products described in the said publication are the ABS polymers mentioned at the outset, which differ clearly from the ASA polymers according to the invention. The object of the teaching provided by German Published Application DAS No. 1,745,098 is to produce a polymer blend having high impact strength, high gloss and good tensile properties. The problem of ease of coloring does not arise in these molding materials, in contrast to the weathering-resistant ASA molding materials according to the invention. The coarse graft copolymers in the mixtures according to German Published Application DAS No. 1,745,098 should furthermore have a mean particle size of from 800 to 2,000 nm. The publication does not speak of the use of coarse graft copolymers, the mean particle diameter of which is of the order of magnitude of that of the coarse graft copolymers of the present invention, and also does not state what pattern of properties of the weathering-resistant ASA polymers may be expected by using two graft copolymers having the particle sizes in question.

Those skilled in the art had to assume that when mixing ASA polymers based on fine graft copolymers, such as those disclosed, for example, in German Pat. No. 1,260,135, with ASA polymers based on coarse graft copolymers, such as are known from German Pat. No. 1,911,888, products having properties which additively follow from the properties of the components of the mixture would result. It was surprising that contrary to this expectation the two graft copolymers exhibit a synergistic interaction in the mixtures according to the invention, manifesting itself, for example, in a great increase in the notched impact strength of the mixtures according to the invention. It was also in no way to be expected that the mixtures according to the invention would be as easy to color as the ASA polymers based on fine graft copolymers (component A), even though the mixtures contain 50% or more of a coarse graft copolymer which has completely unsatisfactory coloring characteristics.

The components (A) and (B) of the mixtures according to the invention are prepared by graft copolymerization of a mixture of styrene and acrylonitrile onto a crosslinked, rubbery acrylic acid ester polymer. Since 100% grafting yield cannot be achieved in the graft copolymerization, the polymerization product from the graft copolymerization always contains a proportion of free, non-grafted styreneacrylonitrile copolymer. However, for the purposes of the present invention, the term graft copolymer is only applied to the rubber to which styrene and acrylonitrile have actually been grafted. The proportion of the graft copolymer in the polymerization product from the graft copolymerization can be determined in the conventional manner by extracting the free, non-grafted styreneacrylonitrile copolymer from the polymerization product, for example by methyl ethyl ketone, since the grafting base of the graft copolymer is crosslinked and the graft copolymer is thus insoluble. The principles of the method of separation have already been described by Moore, Moyer and Frazer, Appl. Polymer Symposia No. 7, page 67 et seq. (1968).

Degree of grafting means, for the purposes of the present invention, the percentage proportion, based on the total graft copolymer, of the styrene and acrylonitrile chemically bonded in the grafting branches of the graft copolymer. The degree of grafting can easily be calculated from the analytically determinable composition of the gel which is insoluble in methyl ethyl ketone.

The mean particle sizes according to the invention are in every case the weight-average particle sizes as determined using an analytical ultracentrifuge, in accordance with the method of W. Scholtan and H. Lange, Kolloid-Z. und Z.-Polymere 250 (1972), 782–796. The ultracentrifuge measurement gives the integral mass distribution of the particle diameters of a sample. From this it is possible to deduce what percentage by weight of the particles have a diameter equal to or less than a certain size. The mean particle diameter, also referred to as the $d_{50}$ value of the integral mass distribution, is defined as the particle diameter which is such that 50 percent by weight of the particles have a smaller diameter than this $d_{50}$ value, and equally 50% by weight of the particles have a greater diameter than the $d_{50}$ value. The breadth of size distribution of the rubber particles is characterized not only by the $d_{50}$ value (mean particle diameter) but also by the $d_{10}$ and $d_{90}$ values which are obtained from the integral mass distribution. These two values are defined similarly to the $d_{50}$ value except that they relate to 10 and 90% by weight of the particles respectively. The quotient $$(d_{90}-d_{10})/d_{50}=Q$$

is a measure of the breadth of particle size distribution.

The two graft copolymers to be employed according to the invention, namely components (A) and (B), are prepared in the conventional manner by methods known per se. The graft bases (A1) and (B1) for the two graft copolymers (A) and (B) are crosslinked acrylic acid ester polymers having a glass transition temperature of below 0° C. Preferably, this temperature should be below $-20°$ C., more particularly below $-30°$ C. The glass transition temperature of the acrylic acid ester polymers can, for example, be determined by the DSC method (K. H. Illers, Makromol. Chemie 127 (1969), page 1). Suitable alkyl acrylates for the preparation of the acrylic acid ester polymers are in particular those where alkyl is of 2 to 8 carbon atoms, preferably of 4 to 8 carbon atoms. Specific examples are n-butyl acrylate and ethylhexyl acrylate. To prepare the acrylic acid ester polymers which serve as the grafting base, the acrylic acid esters may be employed as individual compounds or as mixtures with one another.

In order to obtain crosslinked acrylic acid ester polymers, such as are used as grafting bases (A1) and (B1) for the preparation of the graft copolymers (A) and (B), the polymerization of the acrylic acid esters is preferably carried out in the presence of from 0.5 to 10% by weight, preferably from 1 to 5% by weight, based on the total monomers employed for the preparation of the grafting bases, of a copolymerizable, polyfunctional, preferably bifunctional, monomer which effects crosslinking. Suitable bifunctional or polyfunctional crosslinking monomers are those which contain preferably two, but may also contain more than two, ethylenic double bonds which are capable of copolymerization and are not conjugated in the 1,3-positions. Examples of suitable crosslinking monomers are divinylbenzene, diallyl maleate, diallyl fumarate and diallyl phthalate. Tricyclodecenyl acrylate has proved a particularly advantageous crosslinking monomer (cf. German Pat. No. 1,260,135).

The preparation of the graft copolymer (A) to be employed according to the invention can for example be carried out in accordance with the method described in German Pat. No. 1,260,135. For this purpose, the grafting base (A1) is first prepared by polymerizing the acrylic acid ester or esters and the polyfunctional crosslinking monomer, with or without additional comonomers, in aqueous emulsion by conventional methods at from 20° to 100° C., preferably from 50° to 80° C. The conventional emulsifiers, for example alkali metal salts of alkylsulfonic acids or alkylarylsulfonic acids, alkylsulfates, fatty alcohol sulfonates, salts of higher fatty acids of 10 to 30 carbon atoms, or resin soaps, can be used. The sodium salts of alkylsulfonic acids or the sodium salts of fatty acids of 10 to 18 carbon atoms are preferred. Advantageously, the emulsifier is used in an amount of from 0.5 to 5% by weight, especially from 1 to 2% by weight, based on the monomers employed to prepare the grafting base (A1). In general, a water:monomer ratio of from 2:1 to 0.7:1 is used. The polymerization initiators used are in particular the conventional persulfates, eg. potassium persulfate, but redox systems can also be employed. In general, the initiator is used in an amount of from 0.1 to 1% by weight, based on the monomers employed in the preparation of the grafting base (A1). Further polymerization assistants which can be employed are the conventional buffers, used to bring the pH to, preferably, 6–9, for example sodium bicarbonate and sodium pyrophosphate, and from 0 to 3% by weight of a molecular weight regulator, for example a mercaptan, terpinol or dimeric α-methylstyrene.

The precise polymerization conditions, especially the nature, rate of addition and amount of the emulsifier, are selected, within the abovementioned ranges, so that the resulting latex of the crosslinked acrylic acid ester polymer has a $d_{50}$ value in the range of from about 50 to 150 nm, preferably in the range of from 80 to 100 nm. The particle size distribution of the latex should at the same time preferably be narrow. The quotient $Q=(d_{90}-d_{10})/d_{50}$ should be less than 0.5, preferably less than 0.35.

To prepare the graft copolymer (A), a monomer mixture of styrene and acrylonitrile is then polymerized, in the next step, in the presence of the latex of crosslinked acrylic acid ester polymer, obtained above, the weight ratio of styrene to acrylonitrile in the monomer mixture being in the range from 80:20 to 65:35, preferably from 75:25 to 70:30. It is advantageous if this graft copolymerization of styrene and acrylonitrile onto the crosslinked polyacrylic acid ester polymer which serves as the grafting base is again carried out in aqueous emulsion under the conventional conditions, stated above. The graft copolymerization can advantageously be carried out in the same system as the emulsion polymerization used to prepare the grafting base (A1), if necessary with further addition of emulsifier and initiator. The monomer mixture of styrene and acrylonitrile, to be grafted onto the base, can be added to the reaction mixture all at once, in several stages or, preferably, continuously during the polymerization. The graft copolymerization of the mixture of styrene and acrylonitrile onto the crosslinked acrylic acid ester polymer is conducted in such a way that a degree of grafting of from 25 to 45% by weight, preferably of from 30 to 40% by weight, in the graft copolymer (A) results. Since the grafting yield of the graft copolymerization is not 100%, it is necessary to employ a somewhat larger amount of the monomer mixture of styrene and acrylonitrile for the graft copolymerization than would correspond to the desired degree of grafting. The control of the grafting yield of the graft copolymerization, and hence the degree of grafting of the finished graft copolymer (A) is familiar to all those skilled in the art and, for example, is effected, inter alia, by choice of the rate of addition of the monomers or by adding a regulator (Chauvel and Daniel, ACS Polymer Preprints 15 (1974), 329 et seq.). The emulsion graft copolymerization in general produces from about 5 to 15% by weight, based on the graft copolymer, of free, nongrafted styrene/acrylonitrile copolymer. The proportion of the graft copolymer (A) in the polymerization product obtained from the graft copolymerization is determined in accordance with the method specified above.

Component (B) of the mixtures according to the invention consists of a second graft copolymer of styrene and acrylonitrile onto a crosslinked acrylic acid ester polymer as the grafting base. In order to obtain compositions having the pattern of properties desired according to the invention, it has proved essential that the second, coarse graft copolymer (B) should be prepared separately from the first, fine graft copolymer (A). If attempts are made to prepare the mixture of the graft copolymers (A) and (B) by employing, for the graft copolymerization, a mixture of the fine grafting base (A1) and of the coarse grafting base (B2), products having the desired pattern of properties are not obtained, as is shown by the experiments which follow (Comparative Experiment D).

The grafting base (B1) employed for the preparation of the second graft copolymer (B) is also a crosslinked acrylic acid ester polymer. As regards the type of acrylic acid ester to be employed for the preparation of the grafting base (B1), the nature and amount of the crosslinking monomer and the nature and amount of the comonomers which may or may not be used additionally, the comments made above apply and should be referred to.

In contrast to the crosslinked acrylic acid ester polymer which is employed as the grafting base (A1) for the preparation of the graft copolymer (A), the crosslinked acrylic acid ester polymer which serves as the grafting base (B1) for the preparation of the graft copolymer (B) should be coarse, and should have a mean particle diameter (weight average) in the range of from about 200 to 500 nm, preferably in the range of from 250 to 400 nm. It is desirable that this coarse crosslinked acrylic acid ester polymer (B1) should have a narrow particle size distribution, and advantageously the quotient $Q=(d_{90}-d_{10})/d_{50}$ is less than 0.3, preferably less than 0.2. The coarse crosslinked acrylic acid ester polymer which serves as the grafting base (B1) can be prepared by the conventional methods of polymerization used for the preparation of coarse dispersions, but preferably the seed latex method, as described in German Pat. No. 1,911,882 for the preparation of ASA polymers, is employed. In this method, to prepare the crosslinked acrylic acid ester polymer latex having a mean particle diameter within the abovementioned range, a seed latex, which has a particle diameter of preferably less than 120 nm and which has been produced by conventional emulsion polymerization of the acrylic acid ester, the crosslinking monomer and the additional comonomers, if any, in the manner described for the preparation of the fine grafting base (A1), is used as the starting material, and the polymerization of this seed latex is continued by adding additional monomer and emulsifier. In doing so, the conditions are selected, in the conventional manner (cf., for example, J. Appl. Polymer Sci., 9 (1965), 2,929–2,938), so that only the existing polymer particles of the seed latex continue to grow but no new latex particles are formed. The particle size of the resulting coarse latex can be selected as desired by varying the ratio of seed latex to monomers.

To prepare the second graft copolymer (B) according to the invention, a monomer mixture of styrene and acrylonitrile is polymerized in the presence of the previously prepared coarse latex of crosslinked acrylic acid ester polymer, (B1), the weight ratio of styrene to acrylonitrile in this monomer mixture being from 80:20 to 65:35. The graft copolymerization is carried out in emulsion, as for the preparation of the fine graft copolymer (A). The conventional polymerization assistants, such as catalysts, regulators and emulsifiers, and also the conventional polymerization conditions in respect of temperature and the like, as already described above for the emulsion polymerization, are employed. In the graft copolymerization to prepare the second graft copolymer (B), the monomer mixture of styrene and acrylonitrile is employed in such amounts, and the polymerization conditions are so chosen, that a graft copolymer having a degree of grafting of from 20 to 40% by weight, preferably from 20 to 35% by weight, results. As regards the selection of the degree of grafting achieved during the graft copolymerization, and the determination of the proportion of graft copolymer in the polymerization product, the comments made in connection with the preparation of the first graft copolymer (A) apply.

In addition to the two graft copolymers (A) and (B), the mixtures according to the invention contain, as a further component (C), a hard component consisting of one or more copolymers of styrene and/or $\alpha$-methylstyrene with acrylonitrile. The acrylonitrile content in these copolymers in the hard component (C) should be from 20 to 40% by weight, based on the particular copolymer in the hard component. The free, nongrafted styrene/acrylonitrile copolymers formed during the graft copolymerization for the preparation of the components (A) and (B) also form part of this hard component (C). Depending on the conditions selected for the graft copolymerization to prepare the graft copolymers (A) and (B), it may be that a sufficient proportion of hard component (C) has already been formed during the graft copolymerization. In general, however, it is necessary to mix the products obtained from the graft copolymerization with additional, separately prepared hard component (C).

This additional, separately prepared hard component (C) can be a styrene/acrylonitrile copolymer, an $\alpha$-methylstyrene/acrylonitrile copolymer or an $\alpha$-methylstyrene/styrene/acrylonitrile terpolymer. These copolymers can be employed individually, or as mixtures with one another, as the hard component, so that the additional separately prepared hard component (C) of the mixtures according to the invention can, for example, be a mixture of a styrene/acrylonitrile copolymer and an $\alpha$-methylstyrene/acrylonitrile copolymer. Where the hard component (C) of the compositions according to the invention consists of a mixture of a styrene/acrylonitrile copolymer and an $\alpha$-methylstyrene/acrylonitrile copolymer, the acrylonitrile content of the two copolymers should if possible not differ by more than 10% by weight, preferably not more than 5% by weight, based on the copolymer. The hard component (C) of the compositions according to the invention can however also consist of a single styrene/acrylonitrile copolymer only, namely if the same monomer mixture of styrene and acrylonitrile is used both for the graft copolymerizations to prepare the components (A) and (B), and for the preparation of the additional separately produced hard component.

The additional, separately prepared hard component (C) can be obtained by conventional methods. Thus, the copolymerization of styrene and/or $\alpha$-methylstyrene with acrylonitrile can be carried out as a mass polymerization, solution polymerization, suspension polymerization or aqueous emulsion polymerization. Preferably, the hard component (C) has an intrinsic viscosity of from 40 to 100, especially from 50 to 80. The intrinsic viscosity is determined by methods similar to DIN 53,726, 0.5 g of material being dissolved in 100 ml of dimethylformamide.

The mixing of the additionally and separately prepared hard component (C) with the products obtained from the graft copolymerization to prepare the components (A) and (B), in order to form the compositions according to the invention, may be carried out by first mixing some of the hard component (C) with component (A), and the remainder of the hard component (C) with component (B), after which the two part-mixtures (A+C) and (B+C) are brought together and mixed. However, it is equally possible first to mix components (A) and (B) and subsequently to introduce the additional, separately prepared hard component (C) into this mixture of the two graft copolymers (A+B). For the purposes of the invention, the components (A), (B) and (C) are mixed with one another in such amounts, and in such ratios, that in the total mixture (A+B+C) the two crosslinked acrylic acid ester polymers (A1) and (B1) which serve as the grafting bases are present in a weight ratio (A1):(B1) of from about 90:10 to about 35:65 and preferably from 80:20 to 50:50, and that, furthermore, the combined proportion of the two crosslinked acrylic acid ester polymers which serve as the grafting bases, namely (A1+B1), in the total mixture (A+B+C) is from 10 to 35% by weight, preferably from 15 to 30% by weight, based on the mixture (A+B+C).

The components (A), (B) and (C) can be mixed in any desired manner and by any conventional method. For instance, if the components have, for example, been prepared by emulsion polymerization, it is possible to mix the resulting polymer dispersions with one another, then to coprecipitate the polymers, and to work up the polymer mixture. Preferably, however, components (A), (B) and (C) are mixed by conjointly extruding, kneading or milling them, in which case the components must necessarily first be isolated from the solution or aqueous dispersion obtained by polymerization. The graft copolymerization products (components (A) and (B)) which are obtained in aqueous dispersion can also be dehydrated only partially, and be mixed as a moist crumb with the hard component (C), with the complete drying of the graft copolymers taking place during said mixing.

The mixtures according to the invention, of components (A), (B) and (C), may contain, as a further component (D), any additive and/or assistant conventionally used with ASA polymers. Examples of such additives and/or assistants are fillers, other compatible plastics, antistatic agents, antioxidants, flameproofing agents and lubricants. The additives and assistants are employed in conventional effective amounts, preferably of from 0.1 to a total of about 30% by weight, based on the mixture (A+B+C).

It has been found, surprisingly, that in spite of the relatively high proportion of coarse graft copolymer (B), the compositions according to the invention can be colored very easily. Ease of coloration means, for the purposes of the invention, that brilliant hues are achieved with very small amounts of pigment. Hence, the compositions according to the invention can in particular contain admixed dyes or pigments as the additive (D). The dyes or pigments are usually added to the mixture in amounts of from about 0.02 to about 10% by weight, preferably from 0.2 to 5% by weight, based on the mixture (A+B+C). Examples of suitable dyes and pigments are cadmium sulfide, copper phthalocyanine, iron oxides and fine carbon blacks. The moldings produced from these colored compositions are distinguished by an excellent color, and brilliant and luminous hues can be obtained without any dulling or greyness. The moldings produced from the colored compositions by injection molding surprisingly also exhibit virtually no different hue in the region of the gate and of the weld lines, such as are normally very pronounced, and undesirable, when injection molding colored ASA polymers based on fine graft copolymers of component (A). The colored compositions according to the invention, when processed by injection molding, on the other hand exhibit good color uniformity in the region of the gate mark and of the weld lines. In addition to ease of coloration, compared to the conventional ASA polymers, the compositions according to the invention also exhibit greatly improved notched impact strength. As is shown by the Examples which follow, the notched impact strength of the mixtures according to the invention is far above the corresponding values of the individual components. It is also found that the impact strength and ease of coloration distinctly decline or deteriorate if the ratio of the grafting bases (A1):(B1) in the mixtures according to the invention does not lie within the claimed range.

The compositions according to the invention can be processed in accordance with the conventional methods for thermoplastics, for example extrusion and injection molding, to give a great variety of moldings, for example garden furniture, boats, signs, street lamp covers and toys. As has been mentioned, the compositions according to the invention are particularly suitable for the manufacture of colored shaped articles or moldings of the stated type, such as are used, in particular, in the case of garden chairs, toys and signs.

The Examples which follow illustrate the invention. In the Examples, parts and percentages are by weight, unless stated otherwise.

The mean particle size and the particle size distribution were determined from the integral mass distribution by the method mentioned earlier. The grafting yield and hence the proportion of graft copolymer in the product obtained by graft copolymerization were determined by extracting this polymerization product with methyl ethyl ketone at 25° C. The degree of grafting of the graft copolymers, ie. the percentage proportion of grafted styrene and acrylonitrile contained in the graft copolymer, is most simply found from the determination, by elementary analysis, of the nitrogen (originating from acrylonitrile) and the oxygen (originating from the acrylic ester) in the gel which is insoluble in methyl ethyl ketone. The intrinsic viscosity of the hard component was measured in dimethylformamide, as already described. The notched impact strength of the compositions was determined by the method of DIN 53,453 on injection-molded standard small bars at 23° C. These bars were injection molded at 250° C. or 280° C. The ease of coloration was assessed visually on colored injection moldings. In all cases, 0.3% by weight of ultramarine blue was used for coloring the compositions. The ease of coloration was given the following ratings on the basis of the color:

Rating 1: pure, brilliant and clear
Rating 2: pure, almost brilliant, almost clear
Rating 3: somewhat dull, slightly hazy
Rating 4: dull, hazy
Rating 5: dirty and turbid, very hazy

EXAMPLE 1

(a) Preparation of the fine graft copolymer (A)

(a1) 16 Parts of butyl acrylate and 0.4 part of tricyclodecenyl acrylate in 150 parts of water to which one part of the sodium salt of a $C_{12}$–$C_{18}$-paraffinsulfonic acid, 0.3 part of potassium persulfate, 0.3 part of sodium bicarbonate and 0.15 part of sodium pyrophosphate were added, were heated to 60° C., whilst stirring. 10 minutes after the start of the polymerization reaction, a mixture of 82 parts of butyl acrylate and 1.6 parts of tricyclodecenyl acrylate was added in the course of 3 hours. After completion of the monomer addition, the reaction was allowed to continue for a further hour. The resulting latex of the crosslinked butyl acrylate polymer had a solids content of 40% by weight. The mean particle size (weight average) was found to be 76 nm. The particle size distribution was narrow (quotient $Q=0.29$).

(a2) 150 Parts of the polybutyl acrylate latex obtained according to (a1) were mixed with 40 parts of a mixture of styrene and acrylonitrile (weight ratio 75:25) and 60 parts of water, and after adding a further 0.03 part of potassium persulfate and 0.05 part of lauroyl peroxide the mixture was heated for 4 hours at 65° C., whilst stirring. After completion of the graft copolymerization, the polymerization product was precipitated from the dispersion by means of calcium chloride solution at 95° C. washed with water and dried in a warm stream of air. The degree of grafting of the graft copolymer was 35%.

(b) Preparation of the coarse graft copolymer (B)

(b1) 50 Parts of water and 0.1 part of potassium persulfate were added to 2.5 parts of the latex prepared in stage (a1) of the present example, and then a mixture of 49 parts of butyl acrylate and 1 part of tricyclodecenyl acrylate, and a solution of 0.5 part of the sodium salt of a $C_{12}$–$C_{18}$-paraffinsulfonic acid in 25 parts of water, were run in separately over 3 hours, at 60° C. After all had been run in, the polymerization was continued for 2 hours. The resulting latex of the crosslinked butyl acrylate polymer had a solids content of 40%. The mean particle size (weight average for the latex) was found to be 288 nm. The particle size distribution was narrow ($Q=0.1$).

(b2) 150 parts of this latex were mixed with 40 parts of a mixture of styrene and acrylonitrile (ratio 75:25) and 110 parts of water and after adding a further 0.03 part of potassium persulfate and 0.05 part of lauroyl peroxide the mixture was heated for 4 hours at 65° C., whilst stirring. The polymerization product obtained by the graft copolymerization was then precipitated from the dispersion by means of a calcium chloride solution at 95° C., separated off, washed with water and dried in a stream of warm air. The degree of grafting of the graft copolymer was found to be 27%.

(c) Preparation of the hard component

A monomer mixture of styrene and acrylonitrile was polymerized in solution under conventional conditions. The resulting styrene/acrylonitrile copolymer had an acrylonitrile content of 35% and an intrinsic viscosity of 80 ml/g.

(d) Preparation of the mixtures

First, the two graft products prepared according to stages (a) and (b) were separately each mixed with the styrene/acrylonitrile copolymer prepared according to (c), in an extruder at 280° C. The resulting mixtures (A+C) and (B+C) were then mixed with one another in a mixing extruder at 280° C. During mixing of the polymers, 1% of a lubricant (diethyl phthalate), and the dye, were added. Various mixtures were prepared, in which the ratio of the grafting bases of the fine graft copolymer (A) and of the coarse graft copolymer (B) varied as shown in the Table below. All mixtures were selected so that the sum of the two grafting bases (A1+B1) of the fine and of the coarse graft copolymers (A) and (B) in the total mixture (A+B+C) was always 25%. The properties of the mixtures, summarized in the Table which follows, were determined on injection moldings produced from these mixtures.

EXAMPLE 2

The procedure described in Example 1 was followed, except that in stages (a) and (b) the products obtained from the graft copolymerization were not isolated from the aqueous dispersion. The mixture was prepared by first mixing the dispersions of the graft products, obtained in stages (a) and (b), with one another, then coprecipitating the graft products, isolating and drying them, and thereafter mixing the coprecipitated material with a styrene/acrylonitrile copolymer (component C) in a mixing extruder at 280° C., with addition of 1% of lubricant (diethyl phthalate) and of the dye. Again, the mixture was selected so that the sum of the two grafting bases (A1+B1) of the fine end of the coarse graft copolymer (A) and (B) amounted to 25%, based on the mixture (A+B+C). The results are shown in the Table.

COMPARATIVE EXPERIMENT D

90 Parts of the latex prepared as described in Example 1 (a1) were mixed with 60 parts of the latex prepared as described in Example 1 (b1) and then grafted, as described in Example 1 (a2), with 40 parts of a mixture of styrene and acrylonitrile (ratio 75:25). The polymerization product was isolated from the resulting dispersion as described in Example 1 (a2), and was dried. The degree of grafting of the graft copolymers was 35%. The mixture of graft copolymers, thus obtained, was then mixed in a mixing extruder at 280° C., with the styrene/acrylonitrile copolymer prepared as described in Example 1 (c), in a ratio such that the sum of the grafting bases (A1+B1) of the two graft copolymers amounted to 25%, based on the mixture of (A+B+C), 1% of a lubricant (diethyl phthalate), and the dye, also being added. The results are also shown in the Table.

As can be seen from the results, it is only in Experiments 1 to 4, carried out according to the invention, that products are obtained which combine excellent notched impact strength with excellent ease of coloration.

TABLE

| Ex. | Experiment No.[1] | Ratio (A1:B1)[2] | Notched impact strength KJ/m$^2$ | | Ease of coloration |
|---|---|---|---|---|---|
| | | | 250° C.[3] | 280° C.[3] | |
| 1 | A | 100:0 | 15 | 43 | 1 |
| | 1 | 80:20 | 42 | 48 | 1 |
| | 2 | 60:40 | 43 | 42 | 1 |
| | 3 | 40:60 | 41 | 37 | 2 |
| | B | 20:80 | 34 | 33 | 4 |
| | C | 0:100 | 26 | 25 | 5 |
| 2 | 4 | 60:40 | 40 | 40 | 1 |
| | D | 60:40 | 25 | 26 | 2 |

[1] Experiments No. 1 to 4 were carried out according to the invention, and Experiments No. A–D for comparison
[2] Ratio of the grafting bases of the two graft copolymers in the total mixture
[3] Injection molding temperature for the preparation of the test specimens

We claim:

1. A mixture which essentially consists of
(A) a first graft copolymer which is formed from
   (A1) 55–75% by weight, based on (A), of a cross-linked acrylic ester polymer having a glass transition temperature of below 0° C. and a mean particle diameter (weight average) of from 50 to 150 nm, as the grafting base, onto which are grafted
   (A2) from 45 to 25% by weight, based on (A), of a mixture of styrene and acrylonitrile in the weight ratio of from 80:20 to 65:35,
(B) a second, separately prepared graft copolymer which is formed from
   (B1) 60–80% by weight, based on (B), of a cross-linked acrylic ester polymer having a glass transition temperature of below 0° C. and a mean particle diameter (weight average) in the range from 200 to 500 nm, as the grafting base, onto which are grafted
   (B2) 40–20% by weight, based on (B), of a mixture of styrene and acrylonitrile in the weight ratio of from 80:20 to 65:35, and
(C) a hard component consisting of one or more copolymers of styrene and/or α-methylstyrene with acrylonitrile, which copolymers contain 20–40% by weight of acrylonitrile as copolymerized units,
with the proviso that in the mixture ((A)+(B)+(C)) the weight ratio of the grafting bases (A1):(B1) is from about 90:10 to 35:65, and the proportion of the sum of the two grafting bases ((A1)+(B1)) is from about 10 to 35% by weight, based on the total mixture ((A)+(B)+(C)).

2. A mixture as claimed in claim 1, wherein the first graft copolymer (A) is derived from a grafting base (A1) which has a mean particle diameter (weight average) in the range of from 80 to 100 nm.

3. A mixture as claimed in claim 1, wherein the first graft copolymer (A) consists of 60–70% by weight, based on (A), of the grafting base (A1), onto which are grafted 40–30% by weight of the mixture of styrene and acrylonitrile.

4. A mixture as claimed in claim 1, wherein the second graft copolymer (B) is derived from a grafting base (B1) which has a mean particle diameter (weight average) in the range of from about 250 to 400 nm.

5. A mixture as claimed in claim 1, wherein the second graft copolymer (B) consists of 65–80% by weight, based on (B), of the grafting base (B1), onto which are grafted 35–20% by weight, based on (B), of the mixture of styrene and acrylonitrile.

6. A mixture as claimed in claim 1, wherein the two graft copolymers (A) and (B) are present in the mixture in such amounts that the weight ratio of the grafting bases (A1):(B1) is in the range of from about 80:20 to 50:50.

7. A mixture as claimed in claim 1, wherein the components (A), (B) and (C) are present in such amounts that the proportion of the two grafting bases (A1)+(B1) together accounts for from 15 to 30% by weight, based on the total mixture ((A)+(B)+(C)).

8. A mixture as claimed in claim 1, wherein conventional additives and/or assistants, in conventional and effective amounts, are present as a further component (D).

9. A mixture as claimed in claim 8, wherein a dye or organic pigment is admixed as an additive.

10. Moldings or shaped articles when manufactured by injection molding a mixture as claimed in claim 1.

* * * * *